(12) United States Patent
Miller et al.

(10) Patent No.: US 6,566,602 B1
(45) Date of Patent: May 20, 2003

(54) FACEPLATE WITH FLEXIBLE SCREW RETENTION ASSEMBLY

(75) Inventors: Alan C. Miller, Madison, CT (US);
John J. Miller, Milford, CT (US);
Tracy H. Udelson, Westerly, RI (US);
Randolph R. Ruetsch, Branchburg, NJ (US); Raul Pereira, Cumberland, RI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/570,056

(22) Filed: May 12, 2000

(51) Int. Cl.⁷ .................................................. H02G 3/14
(52) U.S. Cl. ........................... 174/66; 174/67; 220/241; 220/242
(58) Field of Search .............................. 174/66, 67, 48; 220/3.8, 241, 242, 220; 411/545, 533, 531, 544; D13/156, 152; D8/350, 351, 352, 353

(56) References Cited

U.S. PATENT DOCUMENTS

| | | | | |
|---|---|---|---|---|
| 1,589,898 A | | 6/1926 | Reeves | |
| 2,506,953 A | * | 5/1950 | Dzus | 411/533 |
| 4,355,198 A | * | 10/1982 | Gartland, Jr. | 174/66 |
| 4,504,698 A | * | 3/1985 | Greenwood | 174/48 |
| 4,534,486 A | * | 8/1985 | Eidson | 174/66 |
| 4,780,039 A | * | 10/1988 | Hartman | 411/533 |
| 4,781,503 A | * | 11/1988 | Bogel | 411/533 |
| 4,952,756 A | | 8/1990 | Meyers | 174/67 |
| 5,144,099 A | | 9/1992 | Cardy | 174/66 |
| 5,170,013 A | * | 12/1992 | Borsh et al. | 174/53 |
| 5,524,330 A | * | 6/1996 | Alberini | 174/66 |
| 5,594,205 A | * | 1/1997 | Cancellieri et al. | 174/53 |
| 5,594,206 A | | 1/1997 | Klas et al. | 174/56 |
| RE35,902 E | * | 9/1998 | Calandra, Jr. | 411/545 |
| 5,824,116 A | | 10/1998 | Zutler | 8/471 |
| 5,908,278 A | * | 6/1999 | Hasan et al. | 411/533 |
| 6,102,360 A | * | 8/2000 | Clegg et al. | 174/55 |
| 6,250,034 B1 | * | 6/2001 | Hulsey | 411/545 |
| 6,282,857 B1 | * | 9/2001 | Rubenacker | 411/531 |

* cited by examiner

Primary Examiner—Dean A. Reichard
Assistant Examiner—Angel R. Estrada
(74) Attorney, Agent, or Firm—Jeffrey J. Howell; Alfred N. Goodman (57) ABSTRACT

A cover for a wall mounted enclosure having a faceplate with first and second sides and an aperture extending through the plate. A screw retention assembly is coupled to the plate adjacent the aperture by a flexible mechanism that is more flexible than the plate. The flexible mechanism is bendable with respect to three separate axes relative to the faceplate, allowing the screw retention assembly to float with respect to the plate about those axes. This enables the faceplate to fit flush against the wall and the screw retention assembly to fit flush against the enclosure even when the enclosure is misaligned or depressed relative to the wall.

32 Claims, 4 Drawing Sheets

FACEPLATE WITH FLEXIBLE SCREW RETENTION ASSEMBLY

BACKGROUND OF THE INVENTION

Covers for wall mounted enclosure, such as electrical outlet boxes, box eliminators, and a wide array of collar devices are common in the wiring industry. The enclosures generally house the wiring and equipment necessary for telecommunication interconnection and/or power connection devices. Usually, the faceplate completely overlies the enclosure to which it is coupled and fits flush against the adjacent wall surface, or more specifically, one plane of the faceplate typically engages the wall and is coplanar therewith.

In conventional faceplates, the mounting screws pass through screw holes rigidly coupled to the faceplate and into the enclosure, coupling the faceplate to the enclosure. The mounting screws typically become fully seated by bottoming out on one face of the faceplate. If the enclosure is perfectly situated inside of the wall, the screws become fully seated when the faceplate bottoms out against the enclosure device. However, if the enclosure is not perfectly situated in the wall, when the screws become fully seated against the faceplate there is still a space or gap between the faceplate and the enclosure. In this situation, over-torquing the screws will force the faceplate to bend and possibly bottom out against the enclosure, deforming the faceplate. This deformation of the faceplate occurs when the plane of the enclosure that accepts the mounting screws is located below or at an angle to the wall surface or the faceplate is mounted to an enclosure that does not sit flush with the adjacent wall surface.

If a faceplate is deformed due to over-torquing the mounting screws, the deformation can damage or negatively impact the performance of the device mounted in the faceplate.

Examples of prior art faceplates are disclosed in the following U.S. Pat. No. 5,824,116 to Zutler; U.S. Pat. No. 5,144,099 to Cardy; U.S. Pat. No. 4,952,756 to Meyers; and U.S. Pat. No. 1,589,898 to Reeves.

Thus, there has been a continuing need for a device that reliably and easily covers a wall mounted enclosure and protects the wires and equipment therein.

SUMMARY OF THE INVENTION

Accordingly, it is an object of the present invention to provide a cover for a wall mounted enclosure that prevents over-torquing of the mounting screws, therefore preventing deformation of the faceplate.

Another object of the present invention is to provide a cover for a wall mounted enclosure in which screw retention assemblies flexibly coupled to the cover can accept misalignment of the enclosure relative to the wall.

Another object of the present invention is to provide a cover for a wall mounted enclosure that enables the cover to bottom out at the same time the mounting screws become fully seated, regardless of the orientation of the enclosure relative to the wall.

The foregoing objects are basically obtained by providing a cover for a wall mounted enclosure, the combination comprising a plate having first and second sides, an aperture extending through the plate, a screw retention assembly, and a flexible mechanism coupling the screw retention assembly to the plate adjacent the aperture, the flexible mechanism being more flexible than the plate.

Other objects, advantages and salient features of the invention will become apparent from the following detailed description which, taken in conjunction with the annexed drawings, disclose a preferred embodiment of the invention.

BRIEF DESCRIPTION OF THE DRAWINGS

Referring to the drawings which form a part of this disclosure.

DETAILED DESCRIPTION OF THE INVENTION

As seen in FIGS. 1–6, cover 10 for a wall mounted enclosure in accordance with the invention comprises a faceplate 12 and two screw retention assemblies 14 and 15. The faceplate has two apertures 16 and 17 extending through the faceplate and the screw retention assemblies 14 and 15 are coupled to the faceplate by flexible mechanisms 18 and 19 adjacent apertures 16 and 17. Cover 10 may be a straight molded design, resulting in a cover in which all the essential components are one integrally molded unit. Straight molded designs are molds in which no cams, lifters or secondary operations are necessary, thereby reducing manufacturing time and expense.

As described in further detail below, cover 10 is coupled to an enclosure 62 mounted in a hole 78 in wall 64 via screws 72 and is received flush against the wall, even if the enclosure and wall are misaligned, due to the flexibility of the screw retention assemblies 14 and 15.

Figure 2:
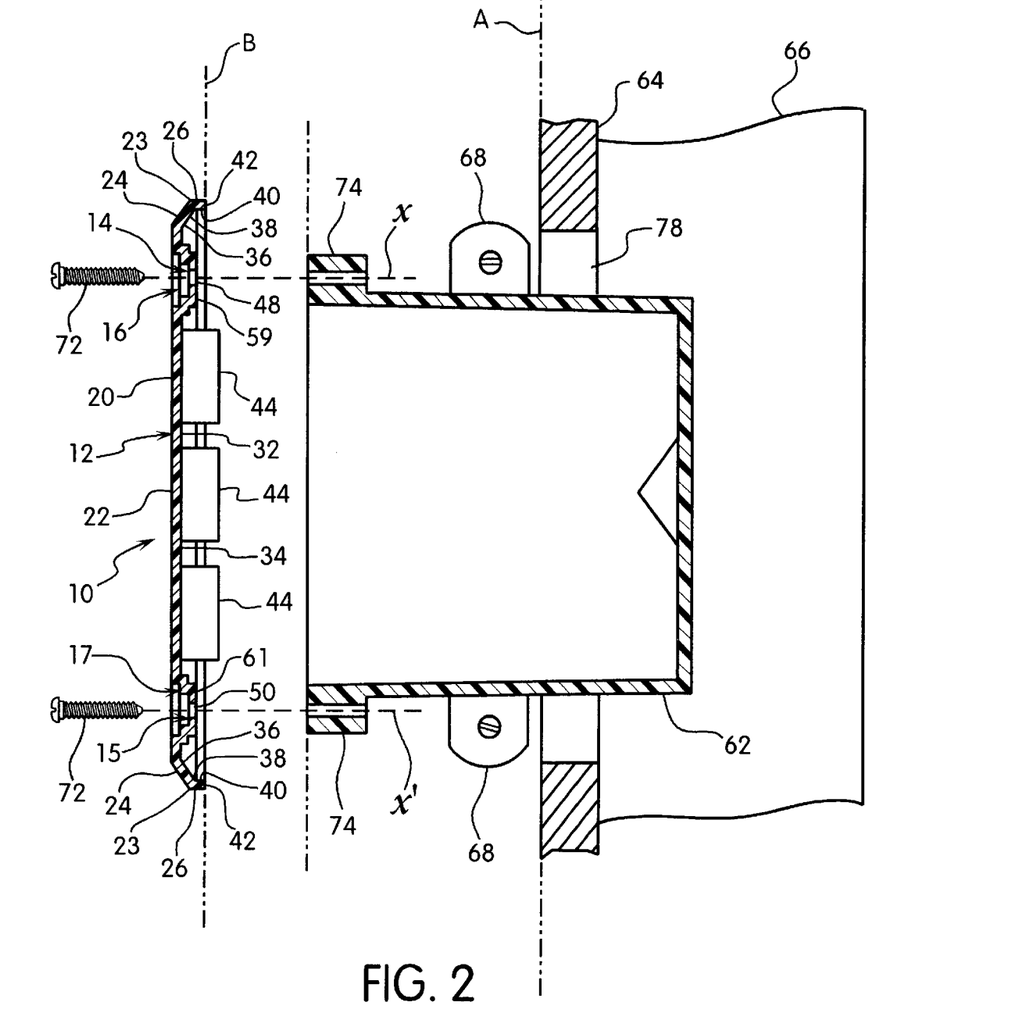
FIG. 2 is an exploded cross-sectional side view of the cover for an enclosure illustrated in FIG. 1 with the electrical device not shown.
Figure 5:
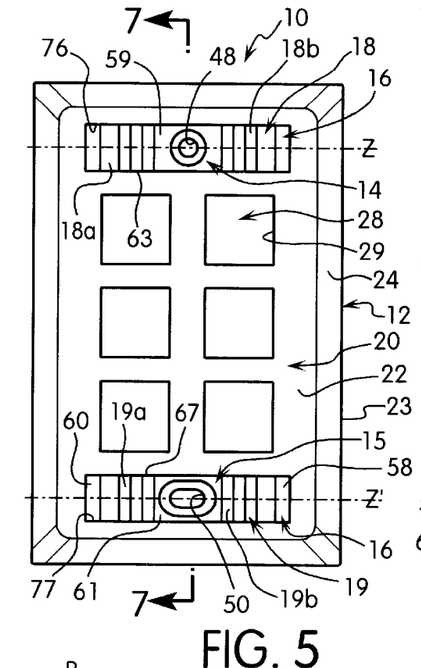
FIG. 5 is an elevational front view of the cover illustrated in FIG. 1.
Figure 6:
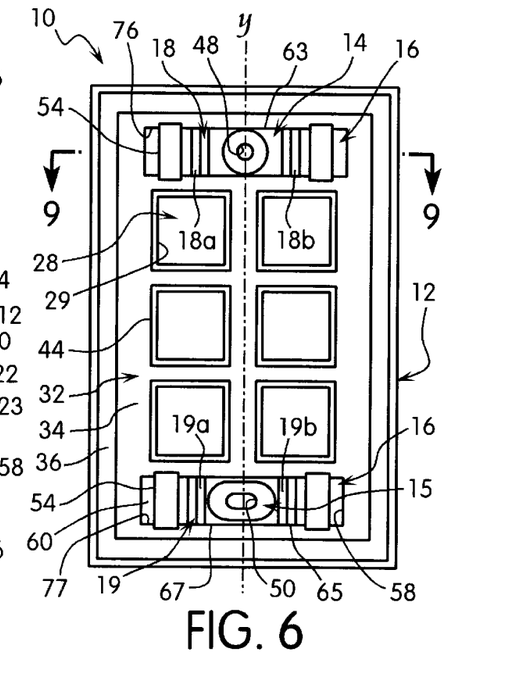
FIG. 6 is an elevational rear view of the cover illustrated in FIG. 5.
Figures 7, 8, 9, 10:
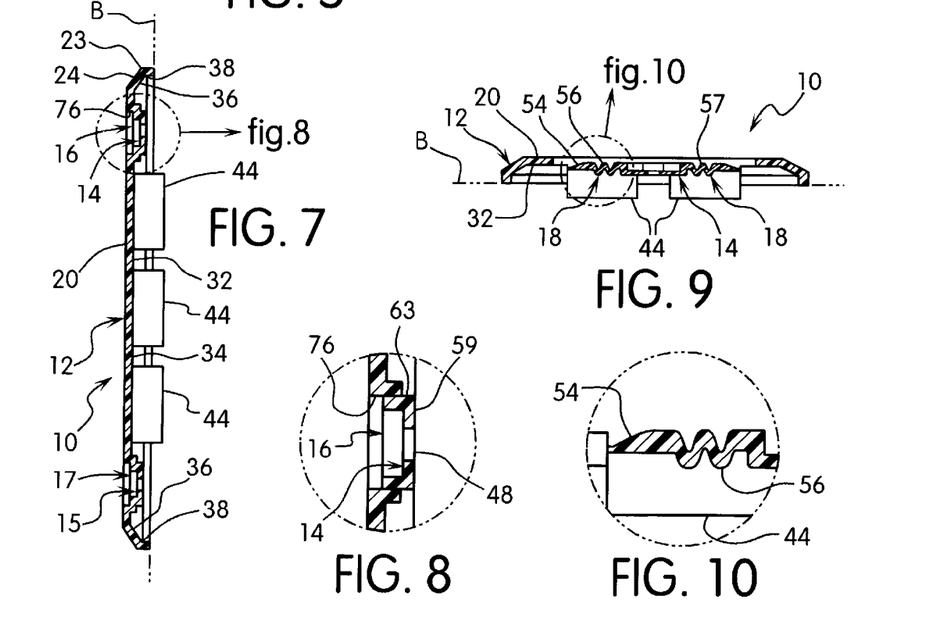
FIG. 7 is an elevational cross-sectional side view of the cover illustrated in FIGS. 5 and 6 taken along line 7—7 in FIG. 5.
FIG. 8 is a detailed and enlarged cross-sectional side view of the screw retention assembly in FIG. 7.
FIG. 9 is a cross-sectional top view of the cover illustrated in FIGS. 5 and 6 taken along line 9—9 in FIG. 6.
FIG. 10 is a detailed and enlarged cross-sectional top view of the resilient mechanism in FIG. 9.

Faceplate 12 is preferably formed of resilient plastic, but may be any other material capable of being manufactured into the desired shape. As seen in FIGS. 2, 5 and 6, faceplate 12 defines a plane B at its rear, a central axis y from top to bottom, and transverse axes z and z' from side to side through the screw retention assemblies 14 and 15. Faceplate 12 also has first or a front side 20 and second or rear side 32. First side 20 preferably forms a flat planar substantially rectangular surface 22, but may be any suitable shape, such as a square, an oval, a circle, or other polygon. Surface 22 is adjacent angled surface 24, which completely surrounds or borders surface 22 with the edge 23 of surface 24 being substantially parallel to the interface between surface 24 and surface 22, as seen in FIG. 5. Surface 24 tapers from edge 23 towards first side 20, the two surfaces meeting to form an angle of about 135 degrees, as seen in FIGS. 2 and 7. Angled surface 24 is also adjacent angled surface 26, which completely surrounds or borders surface 24 with the edge of surface 26 being substantially parallel to the interface between surface 24 and surface 26. The two surfaces likewise meet to form an angle of about 135 degrees. The combination of the angles forms about a 90 degree bend between rectangular surface 22 and angled surface 26. This 90 degree bend makes angled surface 26 substantially perpendicular to rectangular surface 22, as seen in FIG. 2.

Extending through surface 22 of faceplate 12 are two apertures 16 and 17 and six device receiving apertures 28. Preferably, surface 22 has two apertures 16 and 17 extending therethrough, each of which is substantially rectangular, as seen in FIGS. 5 and 6, and each of which is associated with one of the screw retention assemblies 14 and 15. However, there can be any number of such apertures extending through surface 22, including only one aperture, and apertures 16 and 17 may be any suitable shape and placed in any suitable orientation with respect to surface 22.

Figure 1:
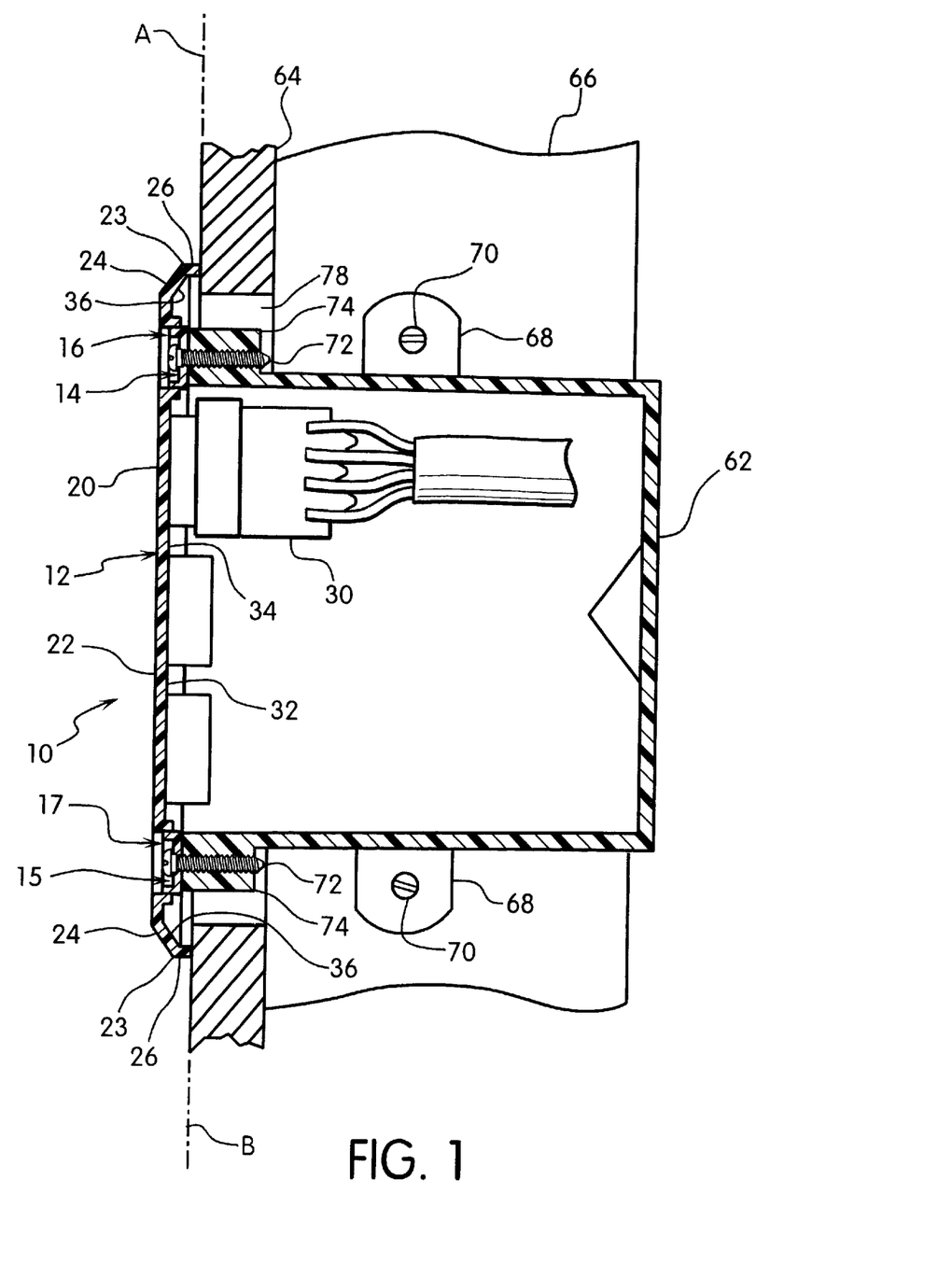
FIG. 1 is an elevational cross-sectional side view of cover for an enclosure in accordance with the present invention mounted in a wall, illustrating the enclosure with an electrical device inserted therein and the enclosure ideally mounted relative to the wall without misalignment or axial depression.

Additionally, faceplate or plate 12 has preferably six rectangular device-receiving apertures 28 extending through surface 22. However, apertures 28 may be any suitable shape and may vary in number from zero (for providing a blank protective cover) to any desired number. Each aperture 28 may receive an electrical device 30, as seen in FIG. 1, such as an RJ-45, a switch, an electrical outlet or any other electrical or data transferring device capable of insertion into a wall or other planar surface. Plate 12 may receive zero, one or more electrical devices 30, as shown in FIG. 1.

As seen in FIGS. 1–4, plate 12 has a second or rear side 32 that is substantially parallel to first side 20. Second side 32 defines a flat planar substantially rectangular surface 34 that has substantially the same dimensions as surface 22. As shown in FIGS. 5 and 6, apertures 16 and 17 and device-receiving apertures 28 extend from surface 22 to surface 34 forming inner peripheries or passageways 76 and 77, respectively that extend through plate 12.

Surface 34 is adjacent angled surface 36, which completely surrounds or borders surface 34 with the edge of surface 36 being substantially parallel to the interface between surface 36 and surface 34, as seen in FIG. 6. Surface 34 tapers from edge 38 towards second side 34, the two surfaces meeting to form an angle of about 135 degrees, as seen in FIGS. 2 and 7. Angled surface 36 is also adjacent angled surface 40, which completely surrounds or borders surface 36 with the edge of surface 40 being substantially parallel to the interface between surface 40 and surface 36. The two surfaces likewise meet to form an angle of about 135 degrees. The combination of the angles forms about a 90 degree bend between rectangular surface 34 and angled surface 40. This 90 degree bend makes angled surface 40 substantially perpendicular to rectangular surface 36. Angled surfaces 36 and 40 are substantially parallel to angled surfaces 24 and 26, respectively. Surfaces 26 and 40 define an edge or plane 42 that is substantially flat and coplanar with first and second sides 20 and 32 and lies in plane B of faceplate 12, as seen in FIG. 2.

In addition, second side 32 has brackets 44 extending therefrom at a substantially 90 degree angle, as shown in FIGS. 1–4. Brackets 44 are coupled to second side 32 and surround apertures 28 in preferably a substantially rectangular pattern, as shown in FIG. 6. Brackets 44 have four walls, each wall is integrally formed with the second side 32 and the two adjacent walls. However, brackets 44 can be any shape that is suitable for inserting an electrical device and/or surrounding apertures 28 and do not have to be integrally formed, they may be attached to each other and the second side by any conventional means, such as glue. Brackets 44 are substantially similar to conventional brackets known to one of ordinary skill in the art and allow electrical or data transmission devices, such as device 30 to be inserted and held by or snapped into faceplate 12.

As seen in FIGS. 1–7, cover 10 preferably has two screw retention assemblies 14 and 15, which are substantially rectangular and couple to second side 32 of plate 12 adjacent apertures 16 and 17. However, there may be any number of screw retention assemblies, including one or more and they may be made from any desired material. The screw retention assemblies can be any shape and size that would allow access to the screw retention assemblies through apertures 16 and 17, and they may be coupled to any side of the plate 12. Additionally, the screw retention assemblies may be located anywhere adjacent apertures 16 and 17 that would allow access for mounting, but preferably they are centered with respect to apertures 16 and 17 and substantially cover the apertures, leaving only a small areas 58 and 60 uncovered, as seen in FIGS. 5 and 6.

Screw retention assemblies 14 and 15 each have a first member 59 and 61, respectively. First members 59 and 61 of screw retention assemblies 14 and 15 each has a screw hole 48 or 50, respectively that pass therethrough. As seen in FIGS. 5 and 6, the screw holes are preferably circular (hole 48) or elliptical (hole 50), the elliptical hole allowing for lateral movement of a screw, facilitating installation. However, screw holes 48 and 50 may be any size or shape that would allow the shaft of the screw to pass therethrough and prevent the head of the screw to pass therethrough. Additionally, first members 59 and 61 have outer, substantially rectangular peripheries 63 and 65, respectively and are coupled to or integrally formed with flexible mechanisms 18 and 19.

As seen in FIGS. 9 and 10, flexible mechanism 18 is corrugated or formed of a series of U-shaped curves or first and second springs devices 18a and 19a and 18b and 19b, respectively that may expand, contract, twist and bend in several directions and axes and snap back due to their resiliency into their original shapes. Flexible mechanisms 18 and 19 are more flexible than prior art faceplates. Prior art faceplates can only flex a minimal amount and any flexing of the plate causes deformation of the device-receiving aperture, possibly damaging the electrical device placed therein. The flexible members 18 and 19 are pivotable about the y, z and z' axes of the faceplate up to about 40 to 50 degrees and can axially travel along the x and x' axes about one-sixteenth on an inch to about three-sixteenths of an inch. This flexing and pivoting prevents the faceplate from deforming and harming the devices in the apertures 16 and 17.

First and second springs are preferably integrally formed with first members 59 and 61, but may be coupled in any conventional manner, such as glue or any other bonding agent, or pins or screws. First springs 18a and 19a connect to the first members at one end and second springs 18b and 19b connect at another end of the first members.

Flexible mechanisms 18 and 19 also have outer peripheries 67 and 69 that are coupled to and extend from first members 63 and 65, respectively, as seen in FIGS. 5 and 6. When the flexible mechanisms are integrally formed with the first members they have a continuous periphery that is substantially identical to the aperture inner peripheries 76 and 77, as seen in FIGS. 5–8. However, it is possible to separately form the flexible mechanisms and the first members, coupling them after formation. The flexible mechanisms and the first members may be any size desirable, even where the height of each is different from the other. Additionally none, one, two or more of the peripheries may be substantially identical to inner peripheries 76 and 77. Furthermore, the flexible mechanisms do not have to be plastic and may be formed from any material that is flexible and does not necessarily have to be resilient. Flexible mechanism 18 is connected to the second side 32 by connectors 54, which are attached to side 32 by any conventional method, such as being integrally molded with, glued, pined, or screwed to second side 32.

Cover 10 is designed to couple to a conventional plastic or metal electrical device enclosure, such as and outlet box, box eliminator or a wide array of collar devices, generally depicted as 62. Enclosure or outlet box 62 fits into a section of a wall 64 that defines a plane A and has hole 76 therethrough, as seen in FIGS. 1–4. Box 62 is coupled into place inside of wall 64 by any conventional method, such as attaching the box to a stud 66 by brackets 68 and screws or fasteners 70. Cover 10 is intended to be is coupled to box 62 by screws or fasteners 72 and internally threaded fastener-receiving members 74 that define longitudinal axes x and x', as seen in FIG. 2.

Operation

As seen in FIGS. 1 and 2, box 62 is placed inside hole 78 in wall 64 and fastened to stud 66 by fasteners 70. Cover 10 then is fastened or screwed to box 62 using fasteners 72, which are received within fastener-receiving members 74. Ideally box 62 is perfectly aligned inside of wall 64, allowing axes x and x' of the fastener-receiving members to be substantially normal or perpendicular to plane A of wall 64. In this situation, when cover 10 is fastened to box 62, edge 42 of the cover sits flush with wall 64 and screw retention assemblies 14 and 15 bottom out and are flush with fastener-receiving members 74, allowing plane A of the wall to be substantially parallel to plane B of the cover, as shown specifically in FIG. 1.

Figure 3:
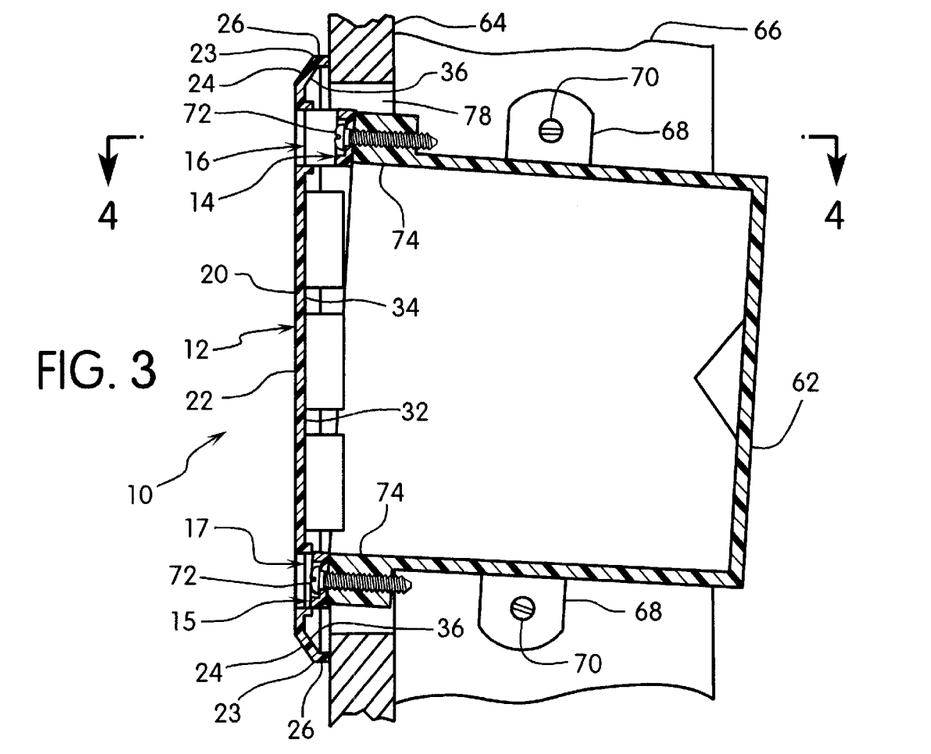
FIG. 3 is an elevational cross-sectional side view of the cover for an enclosure illustrated in FIG. 1 with the electrical device not shown and the enclosure mounted an angle to the wall face.
Figure 4:
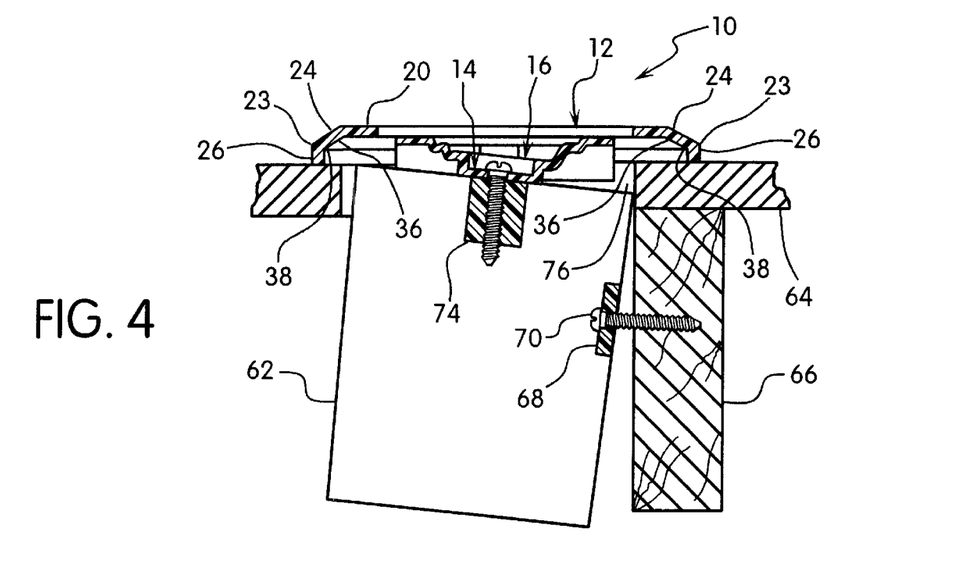
FIG. 4 is an elevational cross-sectional top view of the cover for an enclosure illustrated in FIG. 3 taken along line 4—4 in FIG. 3 with the electrical device not shown and the enclosure mounted an angle to the wall surface.

However, it is probable that box 62 will not be ideally situated within wall 64 and will be set deeper than the wall or askew or misaligned with the wall, as shown in FIGS. 3 and 4. In other words, longitudinal axes x and x' of the fastener-receiving members will not be normal to plane A and/or the front of box 62 will sit inside of wall 62 and not flush or slightly in front of the wall. In conventional faceplates, as stated above, fastening a faceplate to a depressed or misaligned box would likely cause damage to the faceplate and negatively impact the performance of the device mounted in the faceplate.

As seen in FIGS. 3 and 4, cover 10 is able to accept an angular misaligned or depressed box. This is possible by having screw retention assemblies 14 and 15 that are axially movable in a direction substantially parallel to axes x and x', respectively, or axially movable in a direction substantially perpendicular to plane B, through the axial flexing of flexible mechanism 18. In addition, screw retention assemblies 14 and 15 are pivotable about central axis y and transverse axes z and z', respectively of plate 12. By pivoting about these axes, flexible mechanism 18 acts as a universal pivot and by pivoting about these axes and being movable substantially parallel to axes x and x', first members 59 and 61 are able to float with respect to the plate 12.

When coupling a cover 10 to a misaligned or depressed box, screws 72 are passed through screw holes 48 and 50 and into fastener-receiving members 74. Edge 42 of plate 12 contacts wall 64 and mounts flush and substantially parallel thereto. As pressure is applied to screws 72, screws 72 apply pressure to screw retention assemblies 14 and 15. Screw retention assemblies 14 and 15 then apply a force to flexible mechanisms 18 and 19, which bend and pivot in the necessary directions, allowing screw retention assemblies 14 and 15 to sit flush with or be coplanar with fastener-receiving members 74. This allows the cover to bottom out at the same time the mounting screws become fully seated and to prevent over-torquing of the mounting screws.

While a particular embodiment has been chosen to illustrate the invention, it will be understood by those skilled in the art that various changes and modifications can be made therein without departing from the scope of the invention as defined in the appended claims.

What is claimed is:

1. A cover for a wall mounted enclosure, the combination comprising:

a plate having first and second sides;

an aperture extending through said plate;

a screw retention assembly; and a spring having side portions separate from said plate and first and second ends integrally formed with said plate, and coupling said screw retention assembly to said plate adjacent said aperture, said spring being more flexible than said plate and having at least one corrugation.

2. A cover for a wall mounted enclosure according to claim 1, wherein said spring is resilient.

3. A cover for a wall mounted enclosure according to claim 1, wherein said screw retention assembly is coupled to said second side of said plate.

4. A cover for a wall mounted enclosure according to claim 1, wherein said plate has a central axis y and said screw retention assembly is pivotable about said central axis y.

5. A cover for a wall mounted enclosure according to claim 1, wherein said plate has a transverse axis z and said screw retention assembly is pivotable about said transverse axis z.

6. A cover for a wall mounted enclosure according to claim 1, wherein said plate defines a plane B and said screw retention assembly is axially movable in a direction substantially perpendicular to plane B.

7. A cover for a wall mounted enclosure according to claim 1, wherein said plate has a central axis y, a transverse axis z, and a plane B and said screw retention assembly is pivotable about said central axis y and said transverse axis z, and is axially movable in a direction substantially perpendicular to plane B.

8. A cover for a wall mounted enclosure according to claim 1, wherein said plate has a plurality of device receiving apertures therethrough.

9. A cover for a wall mounted enclosure according to claim 1, and further including at least one additional aperture extending through said plate;

at least one additional screw retention assembly; and at least one additional spring coupling each of said screw retention assemblies to said plate adjacent a respective aperture.

10. A cover for a wall mounted enclosure according to claim 1, wherein said screw retention assembly comprises a first member having a hole therethrough, and said spring comprises a first spring that connects said first member and to said plate, and a that connects said first member and to said plate on a side opposite said first spring.

11. A cover for a wall mounted enclosure according to claim 10, wherein said first spring is connected to said first member at one end of said first member, and said second spring is connected to said first member at another end of said first member.

12. A cover for a wall mounted enclosure according to claim 11, wherein said first and second springs are integrally formed with said plate and said first member.

13. A cover for a wall mounted enclosure according to claim 12, wherein said aperture has an inner periphery and said screw retention assembly and said first and second springs have outer peripheries that are substantially identical to the aperture inner periphery.

14. A cover for a wall mounted enclosure, the wall having a substantially planar surface located in plane A and the enclosure having a fastener-receiving member with a longitudinal axis x, the combination comprising:

a plate having first and second sides and an edge;

said edge adapted to abut and be substantially coplanar with the wall;

an aperture extending through said plate; and a screw retention assembly having a hole and a spring for coupling said screw retention assembly to said plate adjacent said aperture, said spring having an arcuate portion and side portions separate from said plate and first and second ends being integrally formed with said plate;

wherein a fastener extending through said hole in said screw retention assembly and received in said fastener-receiving member is adapted to couple said plate to said enclosure, said axis x normally being substantially perpendicular to plane A, but said screw retention assembly able to accept angular misalignment between said x axis and said plane A.

15. A cover for a wall mounted enclosure according to claim 14, wherein said spring comprises a flexible mechanism.

16. A cover for a wall mounted enclosure according to claim 15, wherein said aperture has an inner periphery and said screw retention assembly and said spring have outer peripheries that are substantially identical to the aperture inner periphery.

17. A cover for a wall mounted enclosure according to claim 14, wherein said spring comprises a resilient mechanism.

18. A cover for a wall mounted enclosure according to claim 17, wherein said plate has a central axis y and said screw retention assembly is pivotable about said central axis y.

19. A cover for a wall mounted enclosure according to claim 17, wherein said plate has a transverse axis z and said screw retention assembly is pivoting about said transverse axis z.

20. A cover for a wall mounted enclosure according to claim 17, wherein said screw retention assembly is axially movable in a direction substantially parallel with said longitudinal axis x.

21. A cover for a wall mounted enclosure according to claim 20, wherein said plate has a central axis y and a transverse axis z and said screw retention assembly is pivotable about said central axis y and said transverse axis z.

22. A cover for a wall mounted enclosure according to claim 14, wherein said screw retention assembly's final resting position is coplanar with a portion of the enclosure.

23. A cover for a wall mounted enclosure according to claim 14, wherein said screw retention assembly comprises a first member having a hole therethrough, and said spring comprises a first spring connecting said first member at one end of said first member and to said plate, and a second spring connecting said first member at another end of said first member and to said plate.

24. A cover for a wall mounted enclosure according to claim 23, wherein said first and second springs are integrally formed with said plate and said first member.

25. A cover for a wall mounted enclosure, the wall having a substantially planar surface located in plane A and the enclosure having a plurality of fastener-receiving members, each with a longitudinal axis, the combination comprising:

a plate having first and second sides and an edge;

said edge adapted to abut and be substantially coplanar with the wall;

a plurality of apertures extending through said plate; and a plurality of screw retention assemblies, each having a hole and a resilient U-shaped spring having side portions separate from said plate and first and second ends coupled to said plate for coupling said screw retention assemblies to said second side of said plate adjacent a respective aperture, each of said screw retention assemblies being integrally formed with said plate;

wherein a fastener extending through each hole in said plurality of screw retention assemblies and received in a respective fastener-receiving member is adapted to couple said plate to said enclosure, said longitudinal axes normally being substantially perpendicular to plane A, but said plurality of screw retention assemblies able to accept angular misalignment between said longitudinal axes and said plane A.

26. A cover for a wall mounted enclosure according to claim 25, wherein said plurality of screw retention assemblies are axially movable in a direction substantially parallel to a respective longitudinal axis.

27. A cover for a wall mounted enclosure according to claim 26, wherein said plate defines a central axis and a plurality of transverse axes and said plurality of screw retention assembly are pivotable about said central axis and a respective transverse axis.

28. A cover for a wall mounted enclosure according to claim 25, wherein each of said screw retention assemblies comprise a first member, and each of the resilient springs comprise a first spring connected to said first member at one end of said first member and to said plate, and a second spring connected to said first member at another end of said first member and to said plate.

29. A cover for a wall mounted enclosure according to claim 28, wherein each of said first and second springs are integrally formed with said plate and said first member.

30. A cover for a wall mounted enclosure according to claim 29, wherein each of said plurality of apertures has an inner periphery and each of said plurality of screw retention assemblies and said resilient springs has outer peripheries that are substantially identical to each of said plurality of apertures inner periphery.

31. A cover for a wall mounted enclosure, the combination comprising:

a plate having first and second sides;

an aperture extending through said plate;

a screw retention assembly; and a flexible spring having at least one corrugation and side portions separate from said plate and first and second ends coupled to said plate and integrally formed with said screw retention assembly, and resiliently coupling said screw retention assembly to said plate adjacent said aperture.

32. A cover for a wall mounted enclosure according to claim 31, wherein said flexible spring is integrally formed with said plate.

* * * * *

UNITED STATES PATENT AND TRADEMARK OFFICE
CERTIFICATE OF CORRECTION

PATENT NO.    : 6,566,602 B1  Page 1 of 1
DATED         : May 20, 2003
INVENTOR(S)   : Alan C. Miller et al.

It is certified that error appears in the above-identified patent and that said Letters Patent is hereby corrected as shown below:

<u>Title page,</u>
Item [75], the second inventor's name has been corrected to read -- John J. Milner --

Signed and Sealed this

Eighteenth Day of November, 2003

JAMES E. ROGAN
*Director of the United States Patent and Trademark Office*